United States Patent [19]

Bordes

[11] Patent Number: 5,031,518
[45] Date of Patent: Jul. 16, 1991

[54] ELECTRIC KITCHEN APPLIANCE COMPRISING A HEATING MIXING ACCESSORY

[75] Inventor: Jean-Luc Bordes, Ade, France
[73] Assignee: Seb S.A., Selongey, France
[21] Appl. No.: 376,046
[22] Filed: Jul. 6, 1989

[30] Foreign Application Priority Data

Jul. 6, 1988 [FR] France .................. 88 09157

[51] Int. Cl.⁵ .............. A47J 27/00; A47J 43/04; A47J 43/07
[52] U.S. Cl. ............................... 99/338; 99/348; 99/510; 241/37.5; 241/65; 241/92; 366/146; 366/314; 366/601
[58] Field of Search ........... 366/144, 145, 146, 314, 366/601; 99/337, 338, 348, 509, 468, 510; 241/23, 65, 92, 282.1, 37.5

[56] References Cited

U.S. PATENT DOCUMENTS

| | | | |
|---|---|---|---|
| 2,441,941 | 5/1948 | Shafter | 366/146 |
| 3,005,399 | 10/1961 | Libson . | |
| 3,176,968 | 4/1965 | Appleton . | |
| 3,220,450 | 11/1965 | Aronson, II et al. | 99/348 |
| 4,410,280 | 10/1983 | Yamauchi et al. | 241/282.1 |
| 4,501,538 | 2/1985 | Bray et al. . | |
| 4,619,116 | 10/1986 | Cristante | 366/144 |
| 4,649,810 | 3/1987 | Wong | 99/348 |
| 4,762,057 | 8/1988 | Hirota et al. | 99/468 |
| 4,779,522 | 10/1988 | Wong | 99/348 |
| 4,802,407 | 2/1989 | Negri et al. | 366/146 |

FOREIGN PATENT DOCUMENTS

| | | |
|---|---|---|
| 467123 | 8/1946 | Belgium . |
| 3633452 | 4/1988 | Fed. Rep. of Germany . |
| 1345880 | 11/1963 | France . |
| 2374001 | 7/1978 | France . |
| 2608409 | 6/1988 | France . |
| 2093553 | 9/1982 | United Kingdom .......... 99/348 |

*Primary Examiner*—Timothy F. Simone
*Attorney, Agent, or Firm*—Young & Thompson

[57] ABSTRACT

An electric kitchen appliance comprises a base (1) enclosing an electric motor (2) and transmission members (3, 4, 5) to drive in rotation a vertical shaft (6) that emerges from the base (1). The appliance is adapted to drive either a conventional chopping and slicing member in a receptacle at relatively high speed, or alternatively a heating mixing accessory (13) at relatively low speed. This accessory (13) comprises a receptacle (14) enclosing a working tool (15) such as a mixer, the bottom (16) of this receptacle resting on a heating sole (17). A speed reduction system (18) connected to the working tool (15) is disposed below the heating sole (17) and is part of the accessory. This speed reducer can be coupled to the vertical shaft (6). The accessory thus permits alternatively using the appliance for heating and mixing food preparations such as sauces.

10 Claims, 4 Drawing Sheets

FIG_1

FIG_3

ELECTRIC KITCHEN APPLIANCE COMPRISING A HEATING MIXING ACCESSORY

The present invention relates to an electric kitchen appliance comprising an accessory permitting mixing and heating a food preparation such as a sauce.

There are known electric kitchen appliances comprising a base enclosing an electric motor and transmission members to drive in rotation a vertical shaft protruding from the base, this base being normally adapted removably to receive a container enclosing a chopping and slicing member adapted to be secured directly to the said vertical shaft.

The output shaft of these appliances rotates normally at a speed greater than 1,000 rpm. The speed of rotation is not suitable for the preparation of foodstuffs such as sauces which require much slower speeds of rotation (of the order of 100 to 200 rpm).

Moreover, the appliances of the above type are not provided with heating means.

There are however known electric kitchen appliances of the sauce-making type adapted to mix at low speeds of rotation and to heat the foodstuffs.

These devices comprise a base which encloses a reduction system adapted to achieve a low speed of rotation as well as electric heating means structurally connected to the base of the apparatus.

Of course, these devices do not permit permitting performing the functions of chopping and slicing characteristic of the usual electric kitchen appliances mentioned above.

The object of the present invention is to provide an electric kitchen appliance of the usual type which can be converted to a heating mixing apparatus and which thus can achieve according to the wishes of the user the usual functions of chopping and slicing as well as the function of mixing with heating.

The invention also provides an electric kitchen appliance comprising a base enclosing an electric motor and transmission members to drive in rotation a vertical shaft protruding from the base, this base being normally adapted removably to receive a receptacle enclosing a chopping and slicing member adapted to be directly coupled with the said vertical shaft.

According to the invention, this appliance is characterized in that it comprises also a heating mixing accessory comprising a receptacle enclosing a working tool whose lower part is in thermal contact with heating means, said working tool being adapted to be coupled to the vertical shaft of the base.

Thus this heating accessory is adapted to be positioned on the base of the appliance in the position provided for the usual non-heating accessories of the appliance.

The invention accordingly permits transforming in a simple and economical manner a conventional appliance into a heating appliance.

According to a preferred embodiment of the invention, the heating accessory comprises a speed reduction system connected to the working tool and disposed below the heating means, this reduction system being adapted to be coupled to the vertical shaft of the base.

Thus, to transform a usual appliance into a heating mixing apparatus, it suffices to adapt the accessory on the base of the usual appliance in such a way that the reduction system of this accessory will come into driving relation with the output shaft of the base.

This reduction system permits achieving speeds of rotation much lower than that of said output shaft.

Preferably, the receptacle rests on heating means which is preferably constituted by a heating sole which is an integral part of the accessory.

According to a preferred embodiment of the invention, the accessory comprises a casing enclosing the speed reduction system and comprising an internal wall comprising means to secure the latter to the base. These securement means are identical to those provided at the base of the receptacle which will be directly secured on the base in the case of known appliance.

The said casing comprises an upper wall on which is fixed the heating sole.

According to a preferred embodiment of the invention, the heating sole comprises on its surface adjacent the upper wall of the casing an electric heating resistance, this latter being spaced from said upper wall of the casing by a layer of air, and the sole being connected to this upper wall by means of blocks of thermally isolating material.

Other characteristics and advantages of the invention will appear from the following description.

In the accompanying drawings given by way of non-limiting example:

Figure 1:
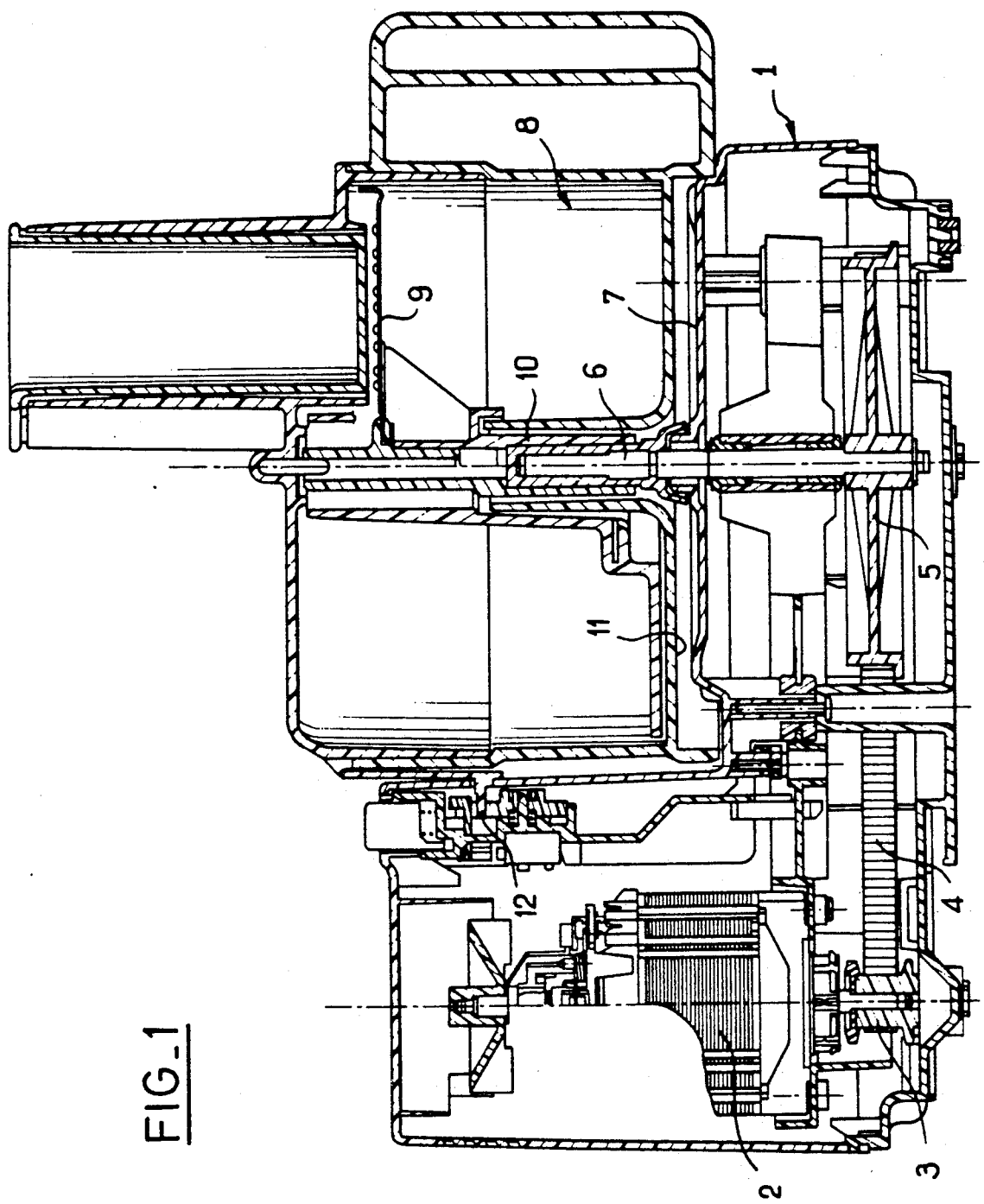
FIG. 1 is a longitudinal cross sectional view of an electric kitchen appliance provided with a nonheating receptacle comprising a rotatable chopping and slicing member.
Figure 2:
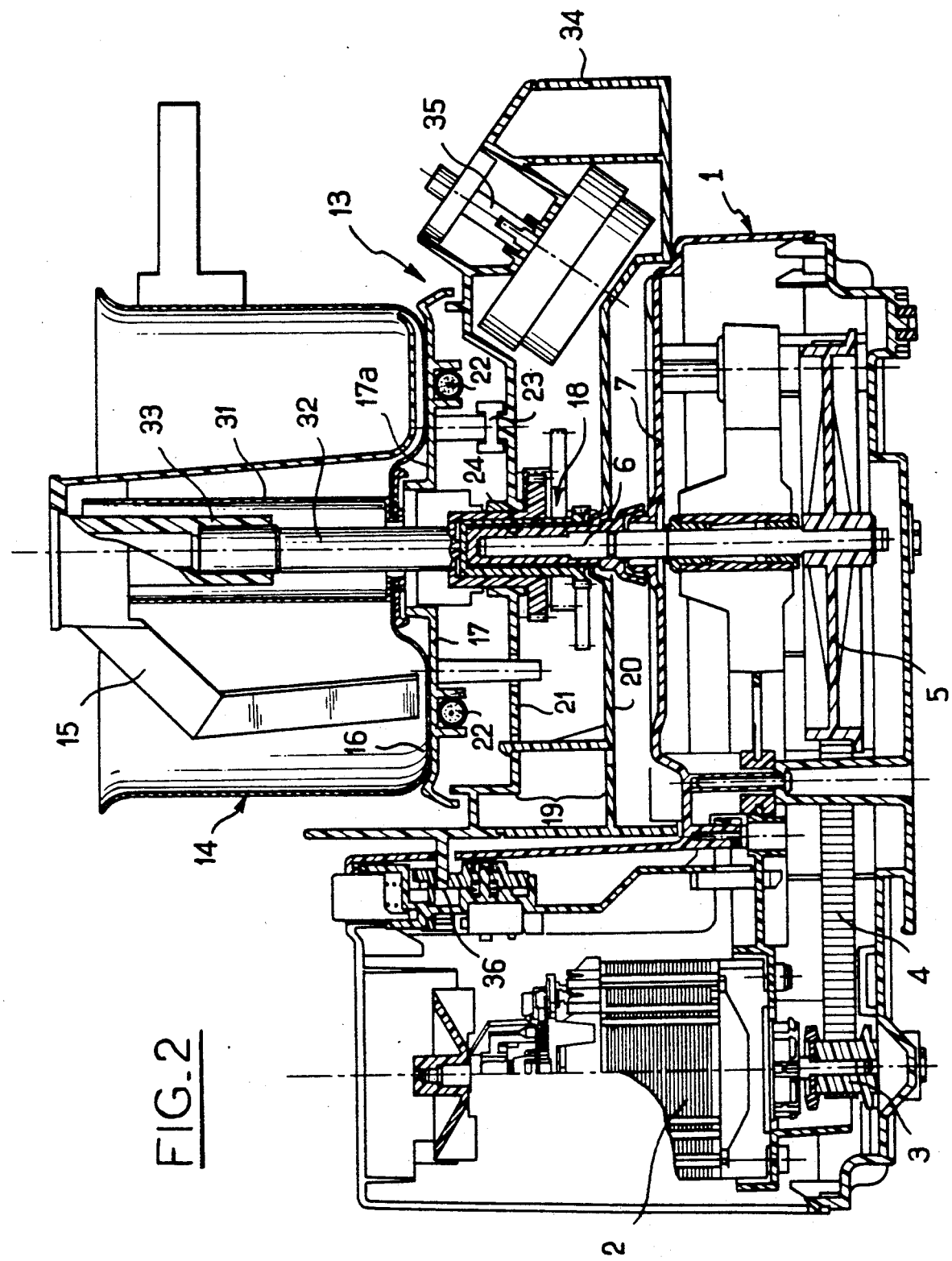
FIG. 2 is a longitudinal cross-sectional view of the appliance outfitted according to the invention with a heating and mixing accessory.

In the embodiment of FIGS. 1 and 2, the electric kitchen appliance comprises a base 1 enclosing an electric motor 2 and transmission members 3, 4, 5 to drive in rotation a vertical shaft 6 protruding from the surface 7 of base 1.

In the example shown in FIG. 1, the base 1 removably receives a receptacle 8 enclosing a rotatable chopping and slicing member 9 whose central hub 10 is directly coupled with the vertical shaft 6 projecting from the surface 7 of the base.

The bottom 11 of the receptacle 8 comprises means (not shown) permitting securing this receptacle 8 to the surface 7 of the base. These securement means can be of the bayonet type.

The side wall of the receptacle 8 has a finger 12 which coacts with an electric security device which does not permit operating the motor except when the receptacle 8 is correctly secured on the base 1.

The output shaft 6 has a speed of rotation of about 1,500 to 1,200 rpm which is well adapted to the functions of chopping and/or slicing.

In FIG. 2, the receptacle 8 has been replaced according to the invention by heating mixing accessory 13.

This accessory 13 comprise a metallic receptacle 14 enclosing a mixing member 15. The bottom 16 of this receptacle 14 rests on a heating sole 17, for example of aluminum. A speed reduction system 18 rotatably connected to the mixing member 15 is disposed below the heating sole 17. This reduction system 18 is a part of the accessory 13 and is removably secured to the vertical shaft 6 of the base 1.

Figure 3:
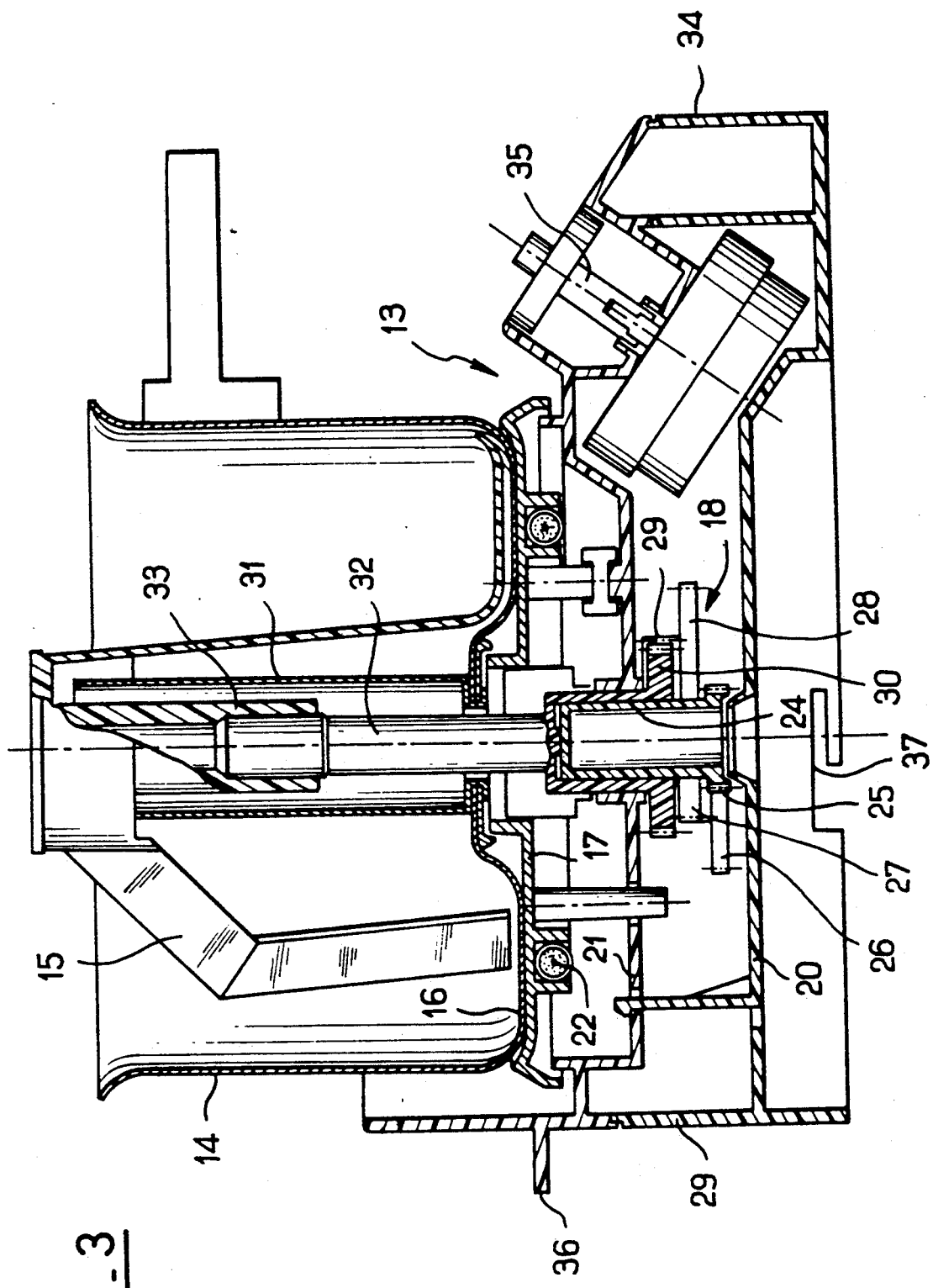
FIG. 3 is a longitudinal cross section of the heating and mixing accessory alone.

The accessory 13 comprises (see also FIG. 3) a casing 19 of plastic material enclosing the speed reduction system 18 and comprising a lower wall 20 having means, for example of the type of a bayonet 37, to secure the latter to the base 1. The securement means are identical to those provided on the base of the receptacle 8, in the case of FIG. 1. The casing 19 comprises an upper wall 21 to which is secured the heating sole 17.

The heating sole 17 comprises on its surface adjacent the upper wall 21 of the casing 19, an electric heating resistance 22 spaced from this upper wall 21 of the casing by a layer of air.

The sole 17 is connected to this upper wall 21 by means of blocks 23 of thermally insulating material, so as to limit the thermal bridges between the heating sole 17 and the casing 19 of plastic material.

The reduction member 18 comprises a vertical recess 24 permitting effecting a coupling by interfitting with the output shaft 6 of the base 1.

The reduction ratio of the reduction system 18 is comprised between 5 and 20. It thus permits reducing the speed of rotation of the mixing member 15 to about 100 to 300 rpm.

Figure 4:
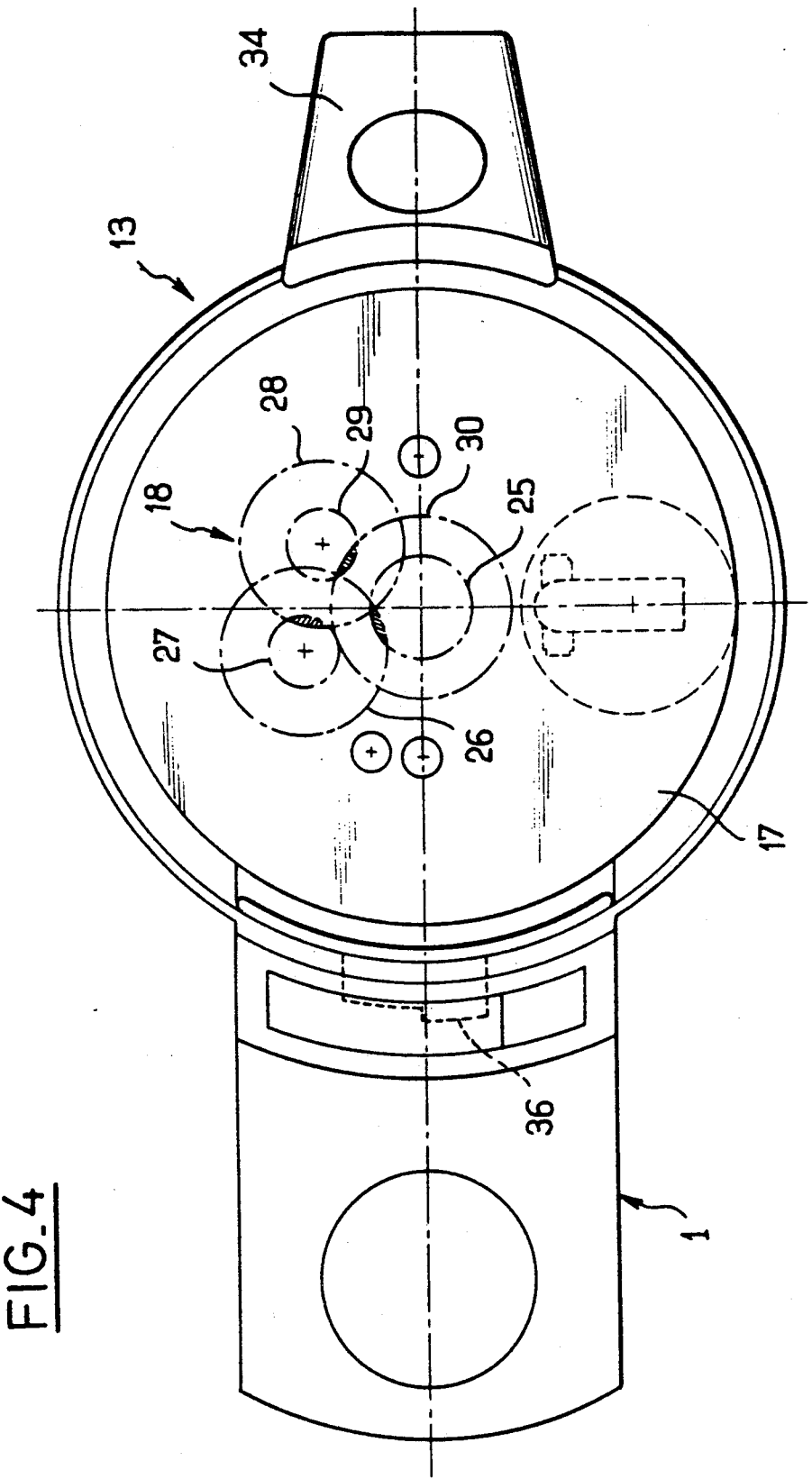
FIG. 4 is a view from above of the appliance provided with the heating and mixing accessory, without the receptacle.

This reduction ratio is achieved by a series of pinions 26, 27, 28, 29, 30 (see FIG. 4) in engagement with each other.

The upper surface 17a of the heating sole 17 comprises means (not shown) to secure by rotation the receptacle 14 on this sole 17. These means can be of the bayonet type.

Moreover, the receptacle 14 comprises a vertical chimney 37 in which is engaged a vertical shaft 32 protruding from the reduction system 18. This shaft 32 is removably coupled to a socket 33 integral with the mixing member 15 rotatably mounted within the receptacle 14.

The casing 19 comprises also a lateral protuberance 34 serving as a gripping handle for the accessory 13. This protuberance 34 encloses timing means 35 for the operation of the heating resistance 22. The timing means used in this embodiment consists of a mechanical timer. It could perfectly well also be an electronic device, coupled if desired to an electronic thermostat system for regulation of the sole 17. Obviously, electric actuation of the heating element 22 is intended. This comprises a cord extending from the wall of the casing 21, not shown in the drawings, and provided with a connector connectible either to an external current supply or to a current source encased in the base 1 of the appliance, and hence the supply depends on the operating condition of the appliance.

Moreover, the casing 19 comprises a lateral finger 36 whose position corresponds to that of the finger 12 of the receptacle 8 and coacts with a safety device to permit operation of the appliance only when the accessory 13 is secured to the base 1.

The use of the heating and mixing accessory which has been described is very simple.

When the user desires to heat and mix up food preparations such as a sauce, it suffices to lift off the base 1 the receptacle 8 provided with the chopping and slicing member and to replace it with the mixing heating accessory 13.

For this purpose, the recess 24 of the reduction system 18 is engaged over the output shaft 6, then the accessory 13 is secured to the base 1 by turning this accessory by means of the handle 34.

The axial socket 33 of receptacle 14 is then engaged on the output shaft 32 of the reduction system and then this receptacle 14 is secured to the heating sole 17.

Of course, the invention is not limited to the embodiment which has been described, as numerous modifications can be made to this without departing from the scope of the invention.

Thus, the casing 19 of the accessory 13 could also enclose a thermostat permitting regulating the heating temperature of the sole 17.

Moreover, the heating sole 17 could be an integral part of the base of the receptacle 14 and could comprise means for removably securing it to the casing 19.

On the other hand, the working tool of the accessory, instead of being a mixing arm could have cutting means.

Still further, the heating means, instead of being constituted by a heating sole or plate on which the receptacle 14 rests, could be constituted by heating means enclosing this receptacle.

Also, the speed reducer could be replaced by an electronic sequencer capable of controlling the speed of rotation of the electric motor located in the base of the appliance.

What is claimed is:

1. An electric kitchen appliance system, comprising
    a base (1) having a support surface (7) and enclosing an electric motor (2) and transmission members (3, 4, 5) to drive in rotation a vertical shaft (6) protruding from the support surface (7);
    a chopping and slicing accessory including a vessel (8) having a bottom (11) for engaging said chopping and slicing accessory with the support surface (7) of the base (1), and a chopping and slicing member (9) adapted to be coupled with the vertical shaft (6) when the chopping and slicing accessory is engaged with the support surface (7) of the base (1); and
    a heating mixing accessory (13) including a bottom (20) for engaging said heating accessory (13) with the support surface (7) of the base (1), a receptacle (14) enclosing a working tool (15), and heating means (17) to receive in thermal contact a lower part (16) of the receptacle (14), said working tool (15) being adapted to be coupled with the vertical shaft (6) when the heating mixing accessory (13) is engaged with the support surface (7) of the base (1).

2. An electric kitchen appliance system according to claim 1, wherein said heating mixing accessory (13) comprises a speed reducer (18) connected to said working tool (15) and disposed below said heating means (17), said speed reducer being adapted to be coupled to said vertical shaft (6) of the base (1).

3. An electric kitchen appliance system according to claim 1, wherein said receptacle (14) rests on said heating means (17).

4. An electric kitchen appliance system according to claim 1, wherein said heating means (17) is a heating sole.

5. An electric kitchen appliance system according to claim 2, wherein said heating mixing accessory (13) comprises a casing (19) enclosing said speed reducer (18) and having a lower wall (20) including means to secure said casing (19) to the base (1).

6. An electric kitchen appliance system according to claim 5, wherein the casing (19) comprises an upper wall (21) on which is secured said heating sole (17).

7. An electric kitchen appliance system according to claim 6, wherein said heating sole (17) comprises on its surface adjacent said upper wall (21) of the casing (19) an electric heatng resistance (22), said resistance (22) being spaced from said upper wall (21) of the casing by a layer of air, and said heating sole (17) being secured to said upper wall (21) by blocks (23) of thermally insulating material.

8. An electric kitchen appliance system according to claim 2, wherein said speed reducer (18) comprises a vertical recess (24) adapted to receive said vertical shaft (6) of the base.

9. An electric kitchen appliance system according to claim 2, wherein said receptacle (14) comprises a central vertical chimney (31) in which is engaged a vertical shaft (32) emerging from said speed reducer (18), the latter said shaft (32) being removably secured in a socket (33) integral with said working tool (15) mounted for rotation within said receptacle (14).

10. An electric kitchen appliance system according to claim 1, wherein the base (1) comprises a safety device, the heating mixing accessory (13) comprises a lateral finger (36) and the chopping and slicing accessory comprises a lateral finger (12), each of said lateral fingers (36,12) coacting with said safety device to prevent operation of the appliance system until said heating mixing accessory (13) or said chopping and slicing accessory is secured to said base (1).

* * * * *